US006092413A

United States Patent [19]

Busch et al.

[11] Patent Number: 6,092,413
[45] Date of Patent: Jul. 25, 2000

[54] METHOD FOR TESTING CORRECTLY CONNECTED LAMBDA SENSORS

[75] Inventors: Michael-Rainer Busch, Ebersbach; Uwe Kleinecke, Winnenden, both of German Dem. Rep.

[73] Assignee: DaimlerChrysler AG, Germany

[21] Appl. No.: 09/025,858

[22] Filed: Feb. 19, 1998

[30] Foreign Application Priority Data

Feb. 19, 1997 [DD] German Dem. Rep. .......... 197 06 382

[51] Int. Cl.[7] .................................................. G01M 19/00
[52] U.S. Cl. .......................................................... 73/118.1
[58] Field of Search ............................... 73/118.1, 23.31, 73/23.32; 60/276, 277; 123/688, 692, 703

[56] References Cited

U.S. PATENT DOCUMENTS

| | | | |
|---|---|---|---|
| 4,167,163 | 9/1979 | Müder | 73/23.2 |
| 4,980,834 | 12/1990 | Ikeda et al. . | |
| 5,212,947 | 5/1993 | Fujimoto et al. . | |
| 5,305,727 | 4/1994 | Gopp | 123/688 |
| 5,390,650 | 2/1995 | Gee et al. | 73/118.1 |
| 5,417,099 | 5/1995 | Ohuchi | 73/23.32 |

FOREIGN PATENT DOCUMENTS

| | | |
|---|---|---|
| 0 691 465 A2 | of 1995 | European Pat. Off. . |
| 41 17 986 C2 | 1/1996 | Germany . |
| 44 23 344 A1 | 1/1996 | Germany . |

*Primary Examiner*—William Oen
*Attorney, Agent, or Firm*—Evenson, McKeown, Edwards & Lenahan, P.L.L.C.

[57] ABSTRACT

The invention provides a method of checking for correct connection of lambda sensors in an internal combustion engine with one or more cylinder groups that incorporates an engine control and a plurality of lambda sensors, with a separate exhaust line with an exhaust catalytic converter and at least one lambda sensor with a lambda-regulating unit connected thereto being associated with each group of cylinders. While retaining the injection of an ignitable mixture at the beginning of a delay time that includes at least the reaction or switching time of the lambda sensors in its current regulating state, the engine control adjusts the lambda-regulating unit of at least one cylinder group, toward rich or lean engine operation and/or suspends its regulating function during the delay. The signal from the lambda sensor intended for use with the selected cylinder group is investigated to determine whether it shows a reaction that is associated with the manipulation performed and indicates a correct connection of this lambda sensor.

4 Claims, 4 Drawing Sheets

METHOD FOR TESTING CORRECTLY CONNECTED LAMBDA SENSORS

BACKGROUND AND SUMMARY OF THE INVENTION

This application claims the priority of German patent document 197 06 382.9, the disclosure of which is expressly incorporated by reference herein.

The invention relates to a method for testing for proper connection of lambda sensors in an internal combustion engine with one or more cylinder groups, where the engine includes an engine control and a plurality of lambda sensors, with an independent exhaust line associated with each cylinder group, and the exhaust line has an exhaust catalytic converter and at least one lambda sensor with a lambda regulating unit connected thereto.

Internal combustion engines of this type are frequently used in motor vehicles, with the lambda sensors positioned upstream and/or downstream of the individual exhaust catalytic converters as required. It is known that a lambda regulating unit can be connected to a given lambda sensor, incorporating an integrator stage and usually a proportional stage, which is not of further interest in this connection. See for example the book by J. Kasedorf, "Steuerungselektronik an Motor und Kraftübertragung" [Control Electronics for Engine and Power Transmission], Vogel-Verlag, 1989, p. 164. In such internal combustion engines, gasoline engines with lambda stereo or quadro control for example, there is a risk of the lambda sensors being improperly connected so that a recognized lambda sensor signal is associated with the wrong cylinder group and the lambda regulating system can become unbalanced. The method of the type recited at the outset serves to detect such connection errors.

German patent document DE 44 23 344 A1 discloses a method of this kind in which the injection valves of one of two rows of cylinders are shut off for a period of time corresponding at least to the reaction or switching time of the lambda sensors. The lambda sensor signal of the lambda sensor associated with the row of cylinders that has been shut off is compared with a predetermined threshold value at the end of the shutoff period of the injection valves. If the connections of the lambda sensors have been made improperly, the lambda sensor signal will overshoot or undershoot the threshold value. An injection valve shutoff method of this kind constitutes a significant intervention in engine operation that makes this known method applicable only with the vehicle at rest, for safety reasons.

Methods for detecting improper operation of an individual lambda sensor in an internal combustion engine are known from German patent document DE 41 17 986 C2 and U.S. Pat. No. 5,212,947, in which the air/fuel ratio of an air/fuel mixture supplied to the engine is adjusted while maintaining an ignitable mixture. The signal from the lambda sensor is then investigated to determine whether it indicates a reaction associated with the change made in the air/fuel ratio, thus indicating a correct function of the lambda sensor. The change in the air/fuel ratio in these known methods is accomplished by a square-wave-shaped variation thereof and/or by alternating reversal of an air/fuel ratio correction factor by an amplitude that can be set in advance.

The object of the invention is to provide a method of the type referred to previously that permits testing for properly connected lambda sensors without significantly interfering with normal engine operation.

This and other objects and advantages are achieved by a first embodiment of the method according to the invention in which, by means of the engine control, the lambda-regulating unit of a given cylinder group (and hence the composition of the fuel/air mixture to be injected into the cylinder in question that is regulated by the lambda-regulating unit) is changed relative to the current state of regulation or its regulating function is suspended during a delay period while retaining the injection of an ignitable mixture at the beginning of a delay period that includes at least the reaction or switching time of the lambda sensors. The lambda regulation is influenced by adjusting or suspending the operation of an integrator stage of the lambda-regulating unit for a delay that can be set in advance. As a result, the fuel/air mixture supplied is influenced, i.e. enriched or leaned out, for the cylinder group in question, said enrichment or leaning out being so slight that it does not significantly interfere with normal engine operation yet, is sufficient to trigger a reaction in the lambda sensor or sensors connected with the particular cylinder group.

Following the elapse of a typical delay time for adjustment, the signals from the one or more lambda sensors intended for this particular cylinder group is checked to determine whether they show a reaction associated with the manipulation performed on the integrator stage in question. In the case of lambda sensors located in line upstream or downstream of an exhaust catalytic converter, when the sensors are properly connected, this reaction produces sensor signals that reflect a time shift in the manipulation performed; that is, first in the sensor located upstream of the catalytic converter and then in the sensor located downstream of the catalytic converter. If the anticipated reaction occurs, it can be concluded that the lambda sensors are properly connected to this cylinder group. If no such sensor signal reaction occurs, the lambda probes have been connected in reverse. The decision can be made on the basis of suitably specified characteristic curves or threshold values for the respective lambda sensor signals.

Because the resulting intervention in engine operation is only minor, the method can be performed while driving, for example simultaneously with other diagnoses performed when the vehicle is in operation, with typical diagnostic times on the order of 0.1 second to 180 seconds. This saves warming up the engine until the catalytic converter operating temperature is reached specifically to perform this test for correctly connected lambda sensors.

In a second embodiment of the invention, the integrator stages for two groups of cylinders are influenced simultaneously, one in the direction of richer engine operation and the other toward leaner engine operation. This permits increased diagnostic reliability.

A third embodiment is especially suitable for checking the correct connection of at least two lambda sensors connected in series within a cylinder group. This procedure is also especially suitable for cold starts, since exhaust oscillations, i.e. lambda fluctuations, can even be measured downstream of an exhaust catalytic converter that is still cold.

Other objects, advantages and novel features of the present invention will become apparent from the following detailed description of the invention when considered in conjunction with the accompanying drawings.

DETAILED DESCRIPTION OF THE DRAWINGS

The exhaust line shown in the figure, for a 12-cylinder gasoline engine, has a conventional design in which a first exhaust line 1*a* is associated with the exhaust manifold for a first cylinder group 2*a,* a second exhaust line 1*b* is connected with the exhaust manifold for a second cylinder group 2*b,* a third exhaust line 1*c* is associated with the exhaust manifold for a third cylinder group 2*c,* and a fourth exhaust line 1*d* is associated with the exhaust manifold for a fourth cylinder group 2*d.* Each cylinder group 2*a* to 2*d* comprises three cylinders. An exhaust catalytic converter 3*a* to 3*d* is located in each exhaust line 1*a* to 1*d*. A first lambda sensor 4*a* to 4*d* is located in the exhaust flow direction upstream of each exhaust catalytic converter 3*a* to 3*d,* while a second lambda sensor 5*a* to 5*d* is located downstream of each exhaust catalytic converter 3*a* to 3*d*. The design of the entire exhaust line in the exhaust flow direction beyond this point is conventional and of no further interest in this regard.

The two lambda sensors of exhaust line 1*a* to 1*d* are each connected with an associated lambda-regulating unit 6, with one representative example shown in the figure and incorporating an integrator stage 7 (shown symbolically shaped in the figure) as well as a proportional stage, which is of no further interest in this connection. The lambda-regulating units 6 are connected in turn with an engine control not shown. The abovementioned signal connections between the lambda sensors 4*a* to 5*d* and the lambda-regulating units 6 as well as between the latter and the engine control are of a conventional design and therefore are symbolized in the figure only by portions of connecting leads.

The method according to the invention described in greater detail below is provided for the exhaust system shown, and indicates whether the various cylinder groups 2*a* to 2*d* are correctly associated with the lambda sensors intended for them. To perform the method, a conventional diagnostic device (not shown) is used that allows integrator stages 7 of lambda-regulating units 6 to be influenced by the engine control. The method can check the wiring of the lambda sensors without having to disconnect them for the purpose, which in turn could create sources of error.

Figure 1:
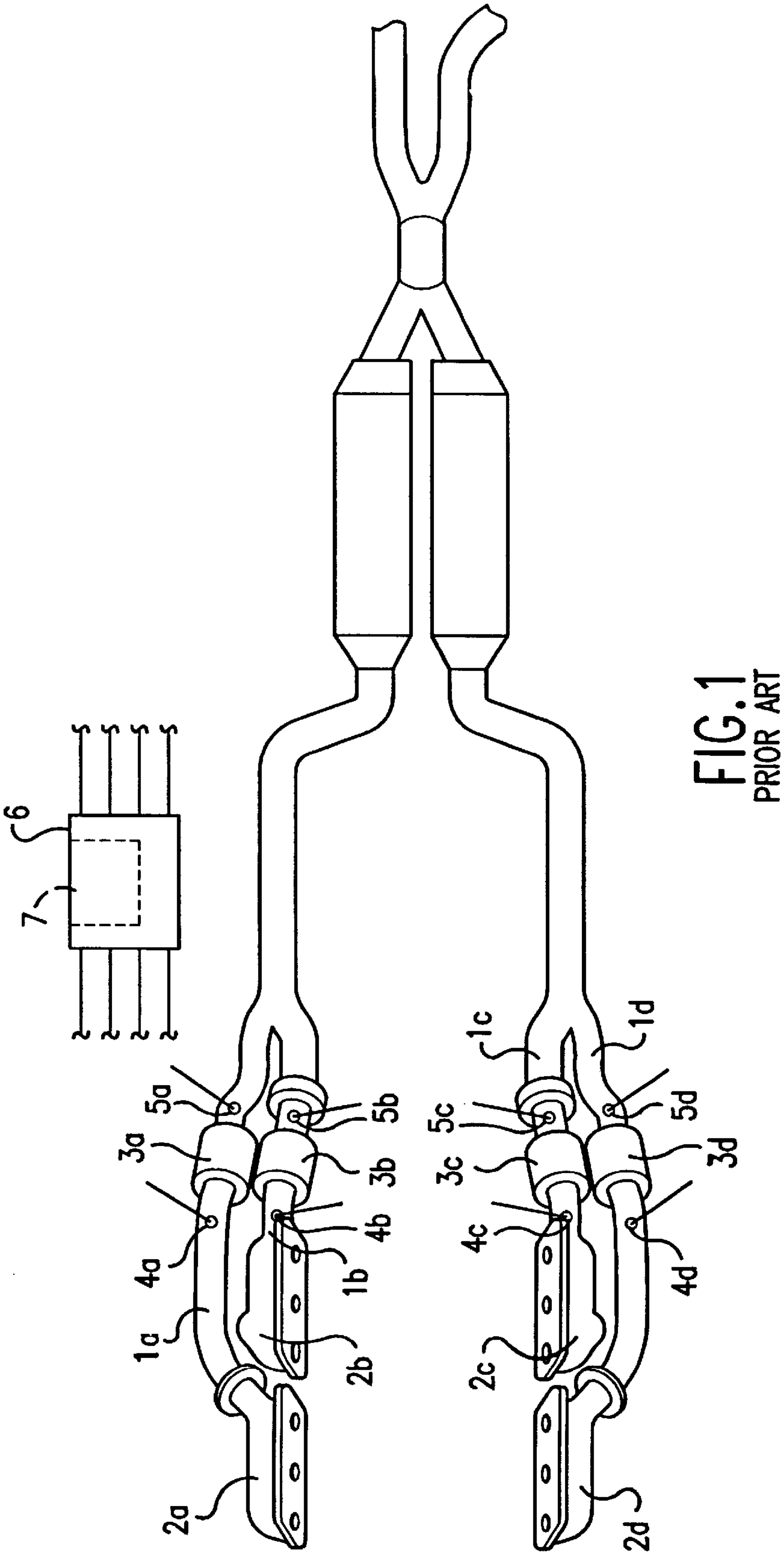
FIG. 1 PRIOR ART
FIG. 1 shows in schematic form the exhaust line of a 12-cylinder gasoline engine with lambda quadro regulation.
Figure 2:
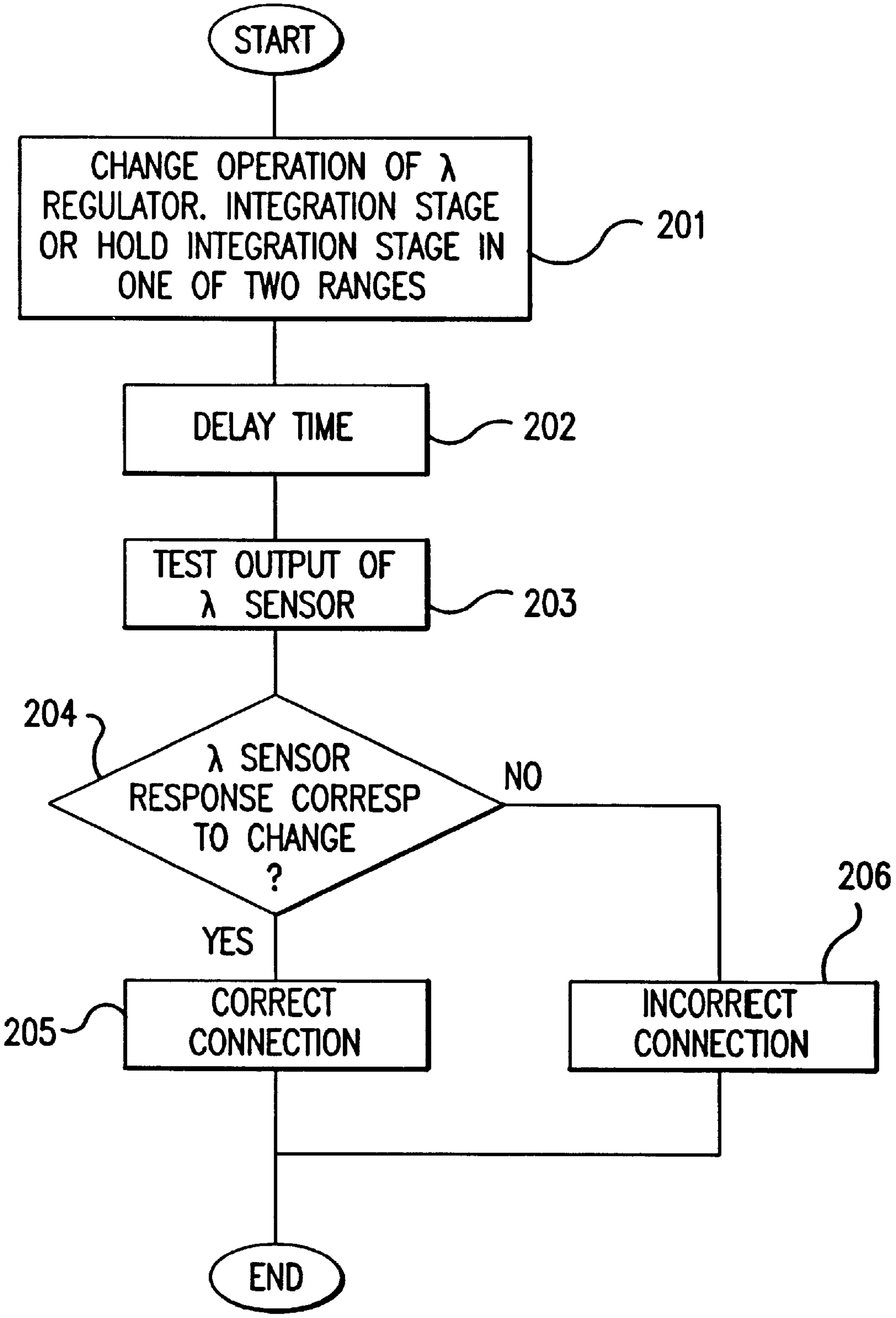
FIG. 2 is a flow chart which illustrates the process according to a first embodiment of the invention.

The method, which is illustrated in FIG. 2, begins as follows: for a first of the four cylinder groups 2*a* to 2*d,* by appropriate input to the diagnostic device regarding engine control, the lambda-regulating unit 6 associated with this selected cylinder group is addressed in such a way that this regulating unit changes its integrator stage 7 or the mixture-forming unit, for a delay period that corresponds at least to the reaction or switching time of lambda probes 4*a* to 5*d* (step 201). Alternatively or in addition, the lambda setpoint or the lambda actual value is changed, as desired or required, either for engine operation that is richer or engine operation that is leaner. Accordingly, for the selected group of cylinders, engine operation is temporarily shifted in either the rich or lean direction. The changing or suspension of the operation of integrator stage 7 and/or the mixture-forming unit can take place for example at the respective endpoint of one integration range before switching to the other integration range; in other words, at the "rich" endpoint of $\lambda \approx 0.9$ for example, or at the "lean" endpoint of $\lambda \approx 1.1$ for example. The lambda value can also be maintained for a longer period of time. This results in elimination of oscillations in the lambda value, or in other words, an approximately quiet probe voltage signal.

At the end of a (step 202) whose duration is typically approximately 50 ms or more (consisting of the adjustment time for the possible abrupt change in lambda, the gas flow time, and the probe reaction time), the signals of all the lambda probes 4*a* to 4*d* are interrogated (step 203). In particular, the signal from those lambda sensors that are intended for the selected cylinder group is analyzed (step 204) to determine whether it shows a reaction corresponding to the manipulation performed on the affected integrator stage and/or the affected lambda setpoint or actual value and the resultant temporary shift in the operation of this cylinder group in the rich or lean direction. For this purpose, the lambda probe signals are suitably evaluated, for example by comparison with set threshold values and/or signal curve characteristics. This can be checked both for the lambda probe located upstream of the respective exhaust catalytic converter and also for the those located downstream. If the signal from the lambda sensor or sensors intended for the selected cylinder group shows the correct (intended) reaction (step 205), this means that this lambda sensor is correctly connected to the proper cylinder group. If the reaction of the signal from the lambda probe intended for the selected cylinder group is not correct (step 206) (indicating an undershooting or overshooting of the respective threshold value and/or deviation of the signal curve from the anticipated curve characteristic), the lambda sensor for this group of cylinders is improperly connected. Advantageously, the result obtained is verified by repeated performance of this test until sufficient diagnostic reliability is obtained.

This test procedure is then repeated with the other cylinder groups until the assignment of the various lambda sensors 4*a* to 5*d* to the various cylinder groups 2*a* to 2*d* is completely ascertained and corrected if necessary. A test cycle typically lasts between approximately 0.1 second and 180 seconds and can be performed during normal driving since engine operation is not significantly disturbed by the enrichment or leaning out of the air/fuel mixture injected into the respective selected cylinder groups depending on the application of the probe installation location. Therefore, no extra operation of the engine with the vehicle at rest is required, nor must it be kept running until the operating temperature of exhaust catalytic converters 3*a* to 3*d* is reached. Instead, the test procedure can be performed simultaneously with other vehicle diagnoses while driving the vehicle. It is unimportant in this connection whether the engine and/or catalytic converter has warmed up to operating temperature. It is only necessary for the lambda sensors to be functioning.

Figure 3:
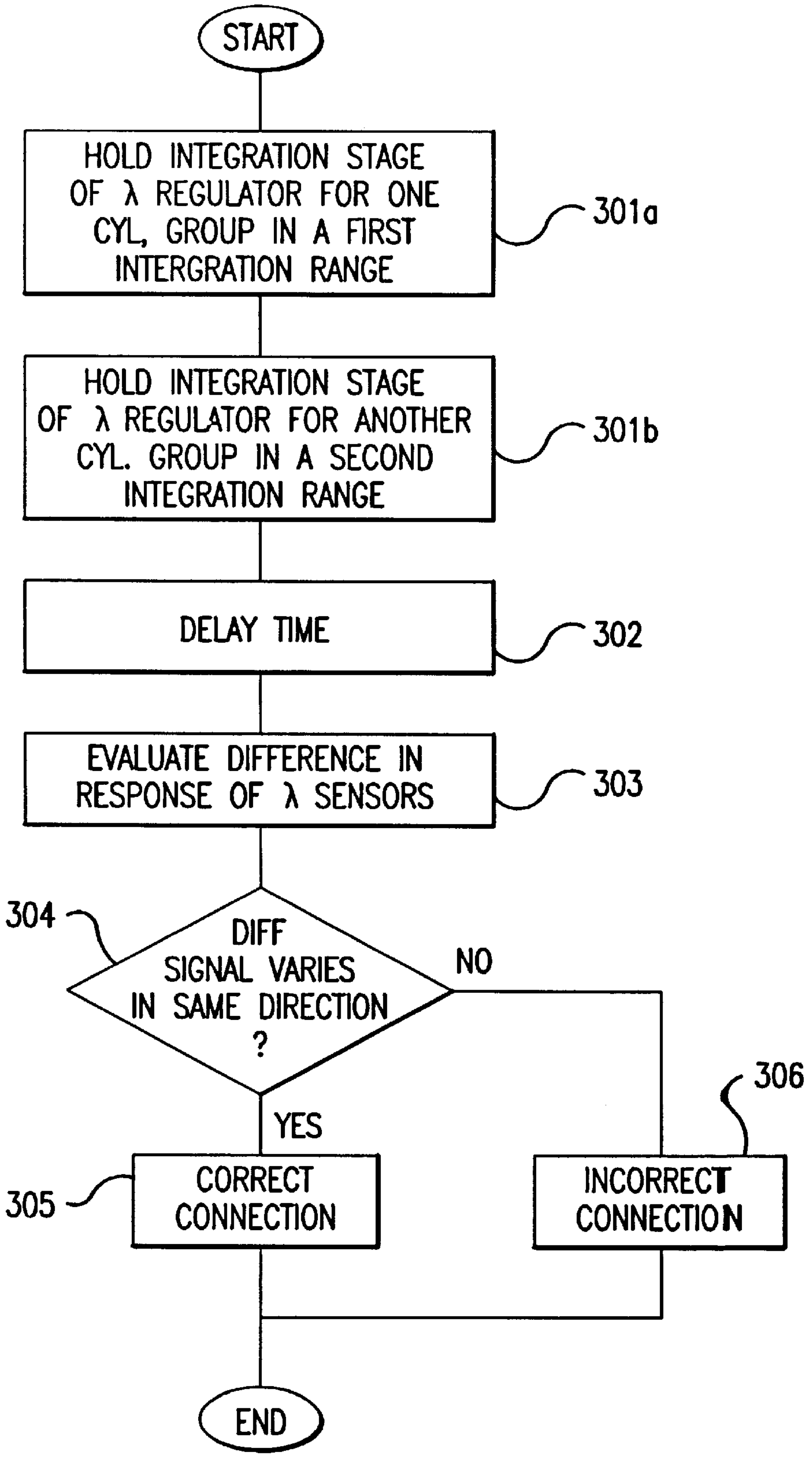
FIG. 3 is a flow chart which illustrates the process according to a second embodiment of the invention.

In an advantageous variation on the method described above, as shown in FIG. 3, provision can be made such that, in each case simultaneously with the suspension or changing of the integrator stage and/or the mixture-forming unit of the lambda-regulating unit of a first selected cylinder group in a range integrating in the direction of rich or lean engine operation (step 301*a*), the integrator stage of the lambda-regulating unit of a second selected cylinder group, to suspend or to change in another range integrating (step 301*b*) in the direction of lean or rich engine operation for the sufficiently dimensioned delay time (step 302) and then to compare the signals (step 303) of the lambda sensors intended for these two cylinder groups. The resultant difference (step 304) in signal varies in the same direction as the change in the case of correctly connected lambda sensors (step 305), but clearly opposite to the lambda change in the case of lambda probes that have been incorrectly connected (step 306), increasing the reliability of the threshold value interrogation and hence the reliability of the diagnosis.

Figure 4:
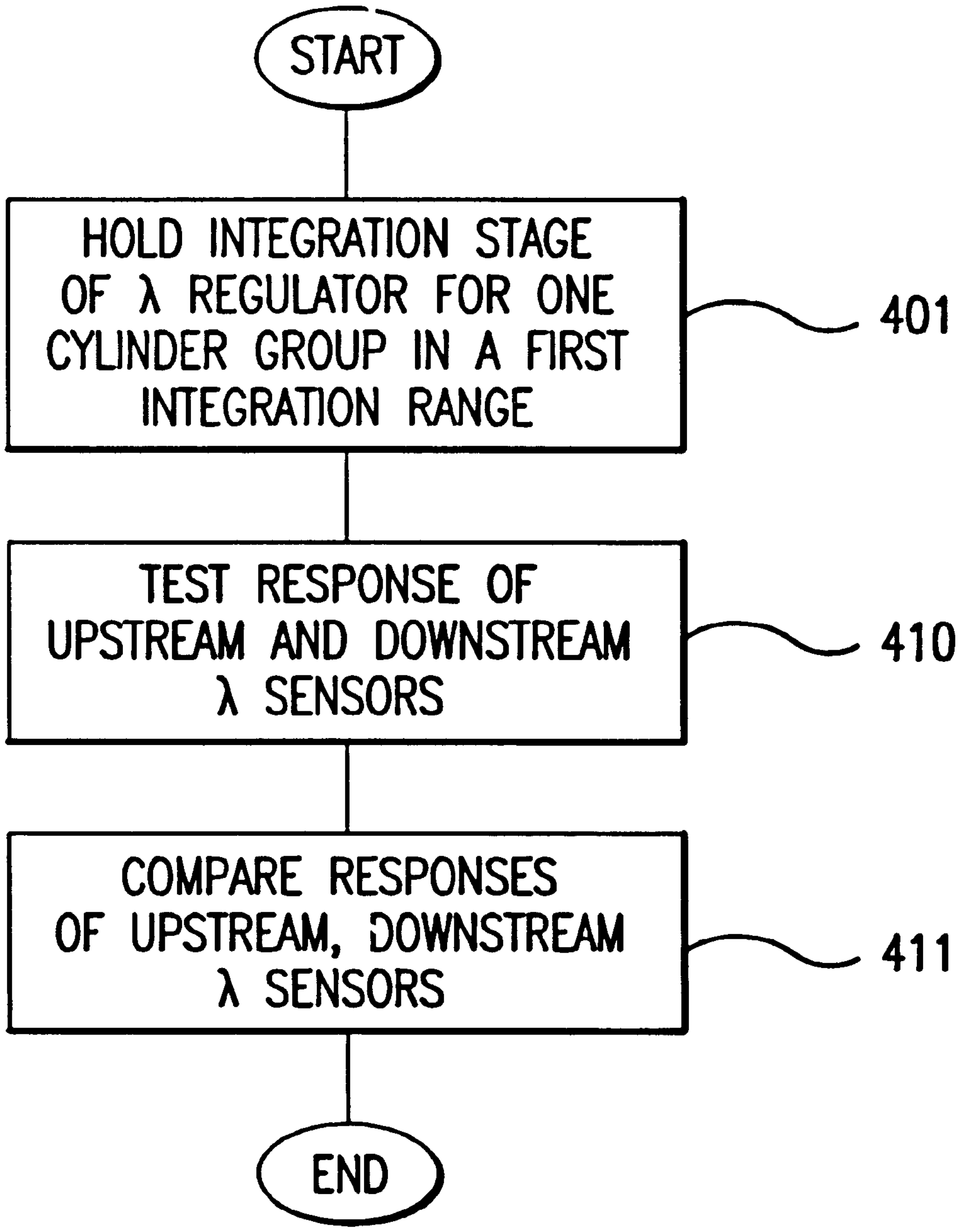
FIG. 4 is a flow chart which illustrates the process according to a third embodiment of the invention.

Of course the method according to the invention can be used not only for the special type of engine described but for all internal combustion engines that have at least two lambda sensors connected in series and/or two groups of cylinders with separate lambda-regulating circuits, as shown in FIG. 4. Not only the wiring of the lambda probes connected upstream of the respective exhaust catalytic converters but also that of a lambda sensor possibly positioned downstream of the exhaust catalytic converter can be checked. A constant signal of a first lambda sensor located upstream of one exhaust catalytic converter is compared with a still-oscillating signal of the other lambda sensor provided downstream of the exhaust catalytic converter for the same group of cylinders (step 411), in order to check for correct connection of the two lambda sensor. A requirement is the presence of an engine control that can provide a delay time for the purpose of testing according to the invention, or can change the lambda integration in the rich and/or lean direction separately for each of the lambda-regulating circuits.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of checking for proper lambda sensor connection in an internal combustion engine having at least one cylinder group, each of said at least one cylinder group being connected to a separate exhaust line which includes an exhaust catalytic converter and at least one lambda sensor arranged in said exhaust line, with a lambda-regulating unit connected to an engine control unit and to said at least one lambda sensor, said method comprising:

at the beginning of a preset delay time that includes at least a response time of the at least one lambda sensor, the engine control unit causing operation of a lambda-regulating unit of a first cylinder group to be changed toward richer or leaner engine operation relative to its current regulating state, or causing a regulating function of said lambda regulating unit of said first cylinder group to be suspended during such delay, by changing operation of an integrator stage of said lambda-regulating unit of said first cylinder group, or by holding operation of said integrator stage in one of two ranges thereof, integrating in the direction of rich or lean engine operation, during the delay; and testing an output signal of said at least one lambda sensor of the first cylinder group no later than an end of the delay, to determine whether it shows a reaction associated with the change or suspension of lambda regulation, indicating correct connection of the at least one lambda sensor to the first cylinder group.

2. Method according to claim 1 wherein the integrator stage of the lambda-regulating unit of the first cylinder group is maintained in a first range, integrating in a first direction during said delay time, and further comprising:

maintaining an integrator stage of a lambda-regulating unit of a second cylinder group in a second range for a corresponding delay time, said second range integrating in an direction opposite to that of the first integrator stage; and testing lambda sensors for the respective first and second cylinder groups at the end of the delay time to determine whether a difference between their signals, showing a reaction to manipulation of the two affected integrator stages, indicates a correct connection of the lambda sensors to the respective cylinder groups.

3. Method according to claim 1 wherein following suspension of the lambda regulating function of the lambda-regulating unit of the first cylinder group, a constant signal of a first lambda sensor located upstream of an exhaust catalytic converter is compared with a still-oscillating signal of a second lambda sensor provided downstream of the exhaust catalytic converter for the same group of cylinders, in order to check for correct connection of the two lambda sensors.

4. A method of checking for proper lambda sensor connection in an internal combustion engine having an exhaust line with at least one lambda sensor connected to a feedback controller which includes an integrator stage for controlling an air/fuel ratio of a fuel mixture input to said engine, comprising:

during a monitoring phase, an engine control unit causing modification of operation of said feedback controller to influence the air/fuel ratio;

waiting a preset delay time equal at least to a response time of said regulating unit and said at least one lambda sensor; and after said preset delay time, testing an output signal of said at least one lambda sensor to determine whether it shows a reaction corresponding to said modification of the operation of the feedback controller, indicating correct connection of the lambda sensor;

wherein said step of causing modification of the operation of the feedback controller comprises one of modifying an operating state of said integrator stage of said feedback controller, and causing said integrator stage to maintain a present operating range, integrating in the direction of rich or lean engine operation.

* * * * *